United States Patent [19]

Ackley

[11] Patent Number: 5,619,027

[45] Date of Patent: Apr. 8, 1997

[54] SINGLE WIDTH BAR CODE SYMBOLOGY WITH FULL CHARACTER SET UTILIZING ROBUST START/STOP CHARACTERS AND ERROR DETECTION SCHEME

[75] Inventor: H. Sprague Ackley, Seattle, Wash.

[73] Assignee: Intermec Corporation, Everett, Wash.

[21] Appl. No.: 433,835

[22] Filed: May 4, 1995

[51] Int. Cl.⁶ .................................................. G06K 7/10
[52] U.S. Cl. ................................. 235/462; 235/463
[58] Field of Search ............................... 235/463, 462, 235/494, 472, 454, 469

[56] References Cited

U.S. PATENT DOCUMENTS

| | | | |
|---|---|---|---|
| 1,985,035 | 12/1934 | Kermode et al. | 209/111 |
| 2,612,994 | 10/1952 | Woodland et al. | 209/111 |
| 3,044,696 | 7/1962 | Feissel | 235/494 |
| 3,359,405 | 12/1967 | Sundblad | 235/61.11 |
| 3,622,758 | 11/1971 | Schanne | 235/61.11 E |
| 3,663,802 | 5/1972 | Wildhaber | 235/494 |
| 3,700,858 | 10/1972 | Murthy | 235/463 |
| 3,744,026 | 7/1973 | Wolff | 235/463 |
| 3,784,792 | 1/1974 | Dobras | 235/463 |
| 3,832,529 | 8/1974 | Nakamura | 235/463 |
| 3,838,251 | 9/1974 | Herrin | 235/463 |
| 3,909,594 | 9/1975 | Allais et al. | 235/61.11 E |
| 4,013,893 | 3/1977 | Hertig | 250/568 |
| 4,056,710 | 11/1977 | Shepardson et al. | 235/437 |
| 4,335,301 | 6/1982 | Palmer et al. | 235/462 |
| 4,379,224 | 4/1983 | Engstrom | 235/463 |
| 4,408,181 | 10/1983 | Galathor | 235/494 |
| 4,687,942 | 8/1987 | Takagi et al. | 250/556 |
| 4,794,239 | 12/1988 | Allais | 235/462 |
| 4,810,867 | 3/1989 | Speicher | 235/494 |
| 4,916,298 | 4/1990 | Raphaël | 235/463 |
| 4,980,544 | 12/1990 | Winter | 235/436 |
| 5,080,456 | 1/1992 | Katz et al. | 359/214 |
| 5,097,263 | 3/1992 | Delpech et al. | 341/155 |
| 5,231,293 | 7/1993 | Longacre, Jr. | 250/568 |
| 5,268,562 | 12/1993 | Lazaridis | 235/462 |
| 5,276,315 | 1/1994 | Surka | 235/462 |
| 5,376,780 | 12/1994 | Klueter | 235/462 |
| 5,380,998 | 1/1995 | Bossen et al. | 235/494 |
| 5,389,770 | 2/1995 | Ackley | 235/462 |
| 5,504,318 | 4/1996 | Joseph et al. | 235/462 |

FOREIGN PATENT DOCUMENTS

| | | | |
|---|---|---|---|
| 0262924 | 4/1988 | European Pat. Off. | |
| 0385783 | 9/1990 | European Pat. Off. | |
| 643730 | 1/1995 | European Pat. Off. | 235/463 |
| 0008728 | 1/1977 | Japan | 235/463 |
| 0074837 | 7/1978 | Japan | 235/463 |
| WO88/02521 | 4/1988 | WIPO | |

OTHER PUBLICATIONS

"Symbologies"—unknown date –cited for general teaching only.

"Report on Unsymmetrical Signals in the Supermarket Scanner," interoffice memorandum, Intermec Corporation, Everett, WA, Jan. 21, 1970.

(List continued on next page.)

*Primary Examiner*—Donald T. Hajec
*Assistant Examiner*—Thien Minh Le
*Attorney, Agent, or Firm*—Seed and Berry LLP

[57] ABSTRACT

A bar code symbology employs symbol characters that are 13 modules wide and employs 4 bars, all of the bars being 1-wide bars. Three of the symbol characters are used as a stop character, a start character and a numeric compression start character. The start/stop characters have a particular bar/space pattern to allow standard bar code readers to determine the state of optical focus of an electro-optical input device in the reader. The numeric compression start character, and a numeric compression latch character, initiate a numeric compression method that allows three symbol characters to encode five numeric data characters. Shift and latch symbol characters allow the full ASCII and extended ASCII characters to be encoded under the symbology of the present invention. The symbology employs a single error detection character generated by a prime modulo 53 method.

29 Claims, 7 Drawing Sheets

OTHER PUBLICATIONS

"Verification –New Insight for an Old Debate," Scan–Tech '87, interoffice memorandum, Intermec Corporation, Everett, WA, Oct. 13, 1987.

Barkan, Eric and David Sklar, "Effects of substrate scattering on bar–code scanning signals", SPIE 362:196–212, 1982.

*Bar Code Print Quality –Guideline,* American National Standards Institute, New York, NY, 1990, pp. 1–29.

Barkan, Eric and Jerome Swartz, "Depth of modulation and spot size selection in bar code laser scanners," in *Proceedings of SPIE's 25th Annual International Technical Symposium and Exhibit,* Int'l. Society for Optical Engineering, San Diego, CA, Aug. 24–28, 1981.

*U.P.C. Symbol Specification Manual,* Uniform Code Council, Inc., Dayton, Ohio, Jan. 1992, pp. 1 through G–4.

"Uniform Symbology Specification Code 49," AIM USA, Philadelphia, PA, Apr. 1993.

"Uniform Symbology Specification Code 93," AIM USA, Philadephia, PA, Apr. 1993.

"Uniform Symbology Specification Interleaved 2–of–5," AIM USA, Philadelphia, PA, Apr. 1993.

"Uniform Symbology Specification Code 128," AIM USA, Philadelphia, PA, Jun. 1993.

"Uniform Symbology Specification Code 16K," AIM USA, Philadelphia, PA, Jun. 1993.

"Uniform Symbology Specification Code 39," AIM USA, Philadelphia, PA, Jun. 1993.

"Uniform Symbology Specification Codabar," AIM USA, Philadelphia, PA, Jun. 1993.

"Uniform Symbology Specification PDF417," AIM USA, Philadelphia, PA, Jul. 1994.

"Uniform Symbology Specification Code One," AIM USA, Philadelphia, PA, Jul. 1994.

Palmer, Roger C., *The Bar Code Book,* Second Edition, Helmers Publishing, Inc., Peterborough, New Hampshire, 1991.

Code 53 Symbol Character Set

| Character Value | Code Set 0 | Code Set 1 | Code Set 2 | b | s | b | s | b | s | b | s | b |
|---|---|---|---|---|---|---|---|---|---|---|---|---|
| 0 | 0 | ^ | ' | 1 | 1 | 1 | 5 | 1 | 2 | 1 | 1 | |
| 1 | 1 | ; | ESC | 1 | 2 | 1 | 5 | 1 | 1 | 1 | 1 | |
| 2 | 2 | < | FS | 1 | 1 | 1 | 5 | 1 | 1 | 1 | 2 | |
| 3 | 3 | = | GS | 1 | 1 | 1 | 4 | 1 | 3 | 1 | 1 | |
| 4 | 4 | > | RS | 1 | 2 | 1 | 4 | 1 | 2 | 1 | 1 | |
| 5 | 5 | ? | US | 1 | 3 | 1 | 4 | 1 | 1 | 1 | 1 | |
| 6 | 6 | @ | ! | 1 | 1 | 1 | 4 | 1 | 2 | 1 | 2 | |
| 7 | 7 | [ | " | 1 | 2 | 1 | 4 | 1 | 1 | 1 | 2 | |
| 8 | 8 | \ | # | 1 | 1 | 1 | 4 | 1 | 1 | 1 | 3 | |
| 9 | 9 | ] | & | 1 | 1 | 1 | 3 | 1 | 4 | 1 | 1 | |
| 10 | A | a | SOH | 1 | 2 | 1 | 3 | 1 | 3 | 1 | 1 | |
| 11 | B | b | STX | 1 | 3 | 1 | 3 | 1 | 2 | 1 | 1 | |
| 12 | C | c | ETX | 1 | 4 | 1 | 3 | 1 | 1 | 1 | 1 | |
| 13 | D | d | EOT | 1 | 1 | 1 | 3 | 1 | 3 | 1 | 2 | |
| 14 | E | e | ENQ | 1 | 2 | 1 | 3 | 1 | 2 | 1 | 2 | |
| 15 | F | f | ACK | 1 | 3 | 1 | 3 | 1 | 1 | 1 | 2 | |
| 16 | G | g | BEL | 1 | 1 | 1 | 3 | 1 | 2 | 1 | 3 | |
| 17 | H | h | BS | 1 | 2 | 1 | 3 | 1 | 1 | 1 | 3 | |
| 18 | I | i | HT | 1 | 1 | 1 | 3 | 1 | 1 | 1 | 4 | |
| 19 | J | j | LF | 1 | 1 | 1 | 2 | 1 | 5 | 1 | 1 | |
| 20 | K | k | VT | 1 | 2 | 1 | 2 | 1 | 4 | 1 | 1 | |
| 21 | L | l | FF | 1 | 3 | 1 | 2 | 1 | 3 | 1 | 1 | |
| 22 | M | m | CR | 1 | 4 | 1 | 2 | 1 | 2 | 1 | 1 | |
| 23 | N | n | SO | 1 | 5 | 1 | 2 | 1 | 1 | 1 | 1 | |
| 24 | O | o | SI | 1 | 1 | 1 | 2 | 1 | 4 | 1 | 2 | |
| 25 | P | p | DLE | 1 | 2 | 1 | 2 | 1 | 3 | 1 | 2 | |
| 26 | Q | q | DC1 | 1 | 3 | 1 | 2 | 1 | 2 | 1 | 2 | |
| 27 | R | r | DC2 | 1 | 4 | 1 | 2 | 1 | 1 | 1 | 2 | |
| 28 | S | s | DC3 | 1 | 1 | 1 | 2 | 1 | 3 | 1 | 3 | |
| 29 | T | t | DC4 | 1 | 3 | 1 | 2 | 1 | 1 | 1 | 3 | |
| 30 | U | u | NAK | 1 | 1 | 1 | 2 | 1 | 2 | 1 | 4 | |
| 31 | V | v | SYN | 1 | 1 | 1 | 2 | 1 | 1 | 1 | 5 | |
| 32 | W | w | ETB | 1 | 2 | 1 | 1 | 1 | 5 | 1 | 1 | |
| 33 | X | x | CAN | 1 | 3 | 1 | 1 | 1 | 4 | 1 | 1 | |
| 34 | Y | y | EM | 1 | 4 | 1 | 1 | 1 | 3 | 1 | 1 | |
| 35 | Z | z | SUB | 1 | 5 | 1 | 1 | 1 | 2 | 1 | 1 | |
| 36 | - | { | ( | 1 | 1 | 1 | 1 | 1 | 5 | 1 | 2 | |
| 37 | . | \| | ) | 1 | 2 | 1 | 1 | 1 | 4 | 1 | 2 | |
| 38 | sp | DEL | NUL | 1 | 3 | 1 | 1 | 1 | 3 | 1 | 2 | |
| 39 | $ | { | * | 1 | 4 | 1 | 1 | 1 | 2 | 1 | 2 | |
| 40 | / | \| | , | 1 | 5 | 1 | 1 | 1 | 1 | 1 | 2 | |
| 41 | + | } | : | 1 | 1 | 1 | 1 | 1 | 4 | 1 | 3 | |
| 42 | % | ~ | rsv | 1 | 2 | 1 | 1 | 1 | 3 | 1 | 3 | |
| 43 | ^1 | ^1 | ^1 | 1 | 3 | 1 | 1 | 1 | 2 | 1 | 3 | |
| 44 | ^2 | ^2 | ^2 | 1 | 4 | 1 | 1 | 1 | 1 | 1 | 3 | |
| 45 | l1 | l1 | l1 | 1 | 1 | 1 | 1 | 1 | 3 | 1 | 4 | |
| 46 | l2 | l2 | l2 | 1 | 3 | 1 | 1 | 1 | 1 | 1 | 4 | |
| 47 | ^0 | ^0 | ^0 | 1 | 1 | 1 | 1 | 1 | 2 | 1 | 5 | |
| 48 | ns | ns | ns | 1 | 2 | 1 | 1 | 1 | 1 | 1 | 5 | |
| 49 | F1 | F1 | F1 | 1 | 6 | 1 | 1 | 1 | 1 | 1 | 1 | |
| 50 | F2 | F2 | F2 | 1 | 1 | 1 | 6 | 1 | 1 | 1 | 1 | |
| 51 | F3 | F3 | F3 | 1 | 1 | 1 | 1 | 1 | 6 | 1 | 1 | |
| 52 | F4 | F4 | F4 | 1 | 1 | 1 | 1 | 1 | 1 | 1 | 6 | |
| 53 | START 0 | | | 1 | 2 | 1 | 1 | 1 | 2 | 1 | 4 | |
| 54 | START ns | | | 1 | 2 | 1 | 2 | 1 | 1 | 1 | 4 | |
| 55 | STOP | | | 1 | 2 | 1 | 2 | 1 | 2 | 1 | 3 | 1 |

Where:
A shift is desginated by a "^."
A latch is designated by an "l."
A shift to the numeric compression mode is designated as "ns."
A function character is designated by an "F."

*Fig. 1*

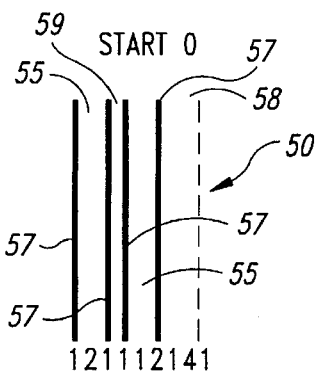
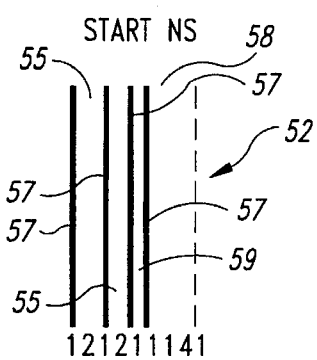
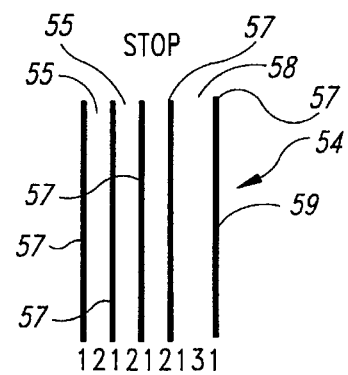
Fig. 2   Fig. 3   Fig. 4
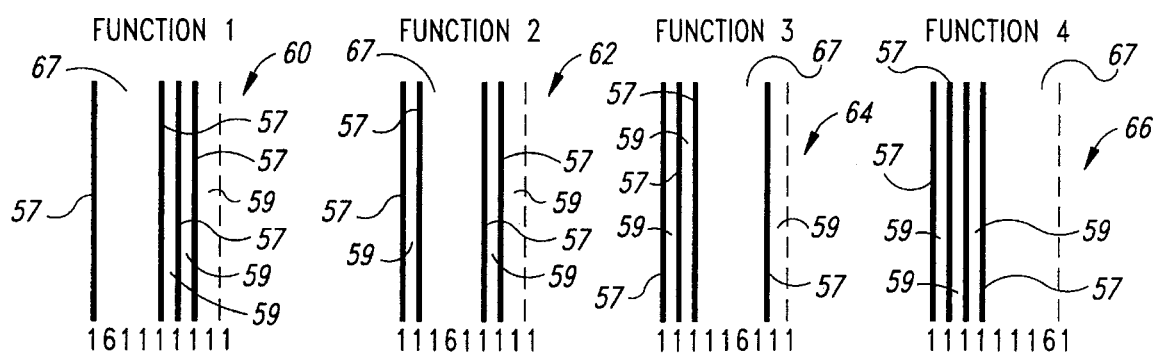
Fig. 5   Fig. 6   Fig. 7   Fig. 8
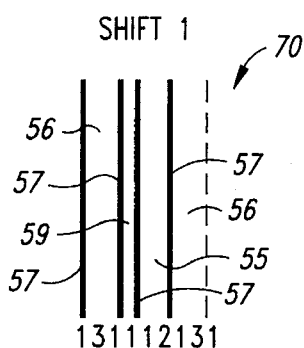
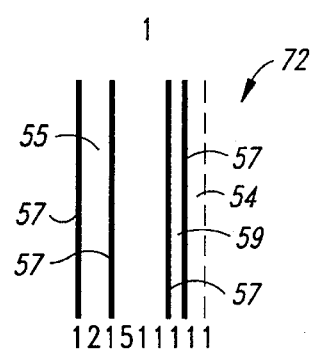
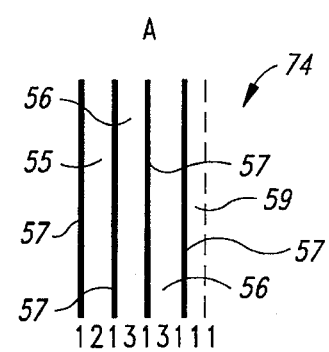
Fig. 9   Fig. 10   Fig. 11

SINGLE WIDTH BAR CODE SYMBOLOGY WITH FULL CHARACTER SET UTILIZING ROBUST START/STOP CHARACTERS AND ERROR DETECTION SCHEME

TECHNICAL FIELD

This invention pertains to the general area of bar code symbologies and particularly to multi-width bar code symbologies with one type of element fixed at a single module width.

BACKGROUND OF THE INVENTION

Bar code symbologies were first disclosed in U.S. Pat. No. 1,985,035 by Kermode and expanded shortly thereafter in the 1930's in U.S. Pat. No. 2,020,925 by Young, assigned to Westinghouse. These early symbologies were printed by generating a multiplicity of single width elements of lower reflectance, or "bars," which were separated by elements of higher reflectance, or "spaces." An "element" is a bar or space. These early symbologies, and many "bar code symbologies" used today can be referred to as "linear symbologies" because data in a given symbol is decoded along one axis or direction. Symbologies such as linear symbologies encode "data characters" (e.g., human readable characters) as "symbol characters," which are generally parallel arrangements of alternating bars and spaces that form unique groups of patterns to encode specific data characters. Data characters include not only human readable characters, but also include special function characters such as start, stop or shift characters that provide certain functional data. Each unique group or pattern of bars and spaces within a predetermined width defines a particular symbol character, and thus a particular data character or characters. A given linear symbol or "bar code symbol" (or "symbol" for short) encodes several data characters along its length as several groups of unique bar and space patterns.

The first bar code symbology patent to Kermode described a symbology that encoded data by varying the number of single width bars separated by a fixed spacing. Young varied both the number of single width bars and the widths of the spaces therebetween. As a result, the symbology of Young could encode a greater amount of data in a given distance for a certain minimum bar width than the symbology of Kermode that employs only a single width element. The symbology of Young thereby recognized that multi-width element symbologies provide a greater "information density" over symbologies employing single width elements.

Many symbologies and applications of the bar code art were described in the intervening years until the first omnidirectional symbology was described by Woodland and Silver in 1952, in U.S. Pat. No. 2,612,994, assigned to IBM. Rather than employing rectangular bars, their symbology utilized bars and spaces that were curved and arranged into a circle. Their symbology, however, also employed single width elements, in this case spaces separated by variable width bars. Therefore, their symbology had less information density than full multi-width element symbologies.

Many symbologies utilizing variable width bars and spaces were described in the art during the 1960's, but none reached broad usage. Sometime during the 1960's, the first successful symbology was developed by an unknown person or persons and was dubbed "2 of 5 code" because of the structure of its symbol characters. The 2 of 5 code is still used today by the airline industry on some airline tickets, and in other industries. The 2 of 5 code utilizes single width spaces separated by bars of one of two widths arranged in a pattern of five bars per character where two of the five bars are always wide. The 2 of 5 code, and other single width element symbologies, did not proliferate further because the information density was inferior to other patterns which utilized variable widths for both the bars and the spaces.

In the 1970's, the next single width element symbology was introduced as a new decode method called "edge-to-edge" decoding and applied to a symbology called "Delta-D code" by McEnroe and Jones of IBM. An edge-to-edge decodable symbology is generally immune to uniform distortions in the printing process such as distortions generated by ink spread. In edge-to-edge decoding, a typical laser scanner reads a bar code by measuring a distance between like edges (e.g., the width of a leading edge of one bar to the leading edge of the next bar in a given symbol). While being valuable in the 1970's, immunity from uniform distortions is less important today because microprocessors and computers can compensate for the distortion effect.

In the 1970's, edge-to-edge decoding was sufficiently popular that it was applied to the newly developed supermarket symbology, U.P.C. The U.P.C. symbology was described generically by Savir and Laurer of IBM as a (7,2) "n,k code" in 1974. An "n,k code" is defined as a symbology where each symbol character has a n number of bars and spaces and whose total length is k modules long. Therefore, the U.P.C. symbology encodes two bars and two spaces in each symbol character and each symbol character is seven modules long. A module is the narrowest nominal width unit of measure in a bar code symbology (a 1-wide bar or space). "Nominal" refers to the intended value of a specific parameter, regardless of printing errors, etc.

A great advantage of the single-width bar symbologies such as Delta-D code was that they were generally easy to print, capable of being implemented on a typewriter type printing device. Another advantage of the single-width bar symbologies was that they were easy to read, due to the absence of different bar widths. Typical bar code scanners read bar codes by producing different analog waveforms from bar codes having variable width bars and spaces. When the scanner fails to fully resolve the smallest, one-wide elements, only the wider elements (i.e., two-wide or larger width elements) become resolved. A bar or space is "resolved" if the scanner is able to identify a peak or valley in the wave form that corresponds to the given bar or space. Consequently, when one element is fixed, the variability of that element type is reduced. For example, if a symbology has only one-wide bars, the scanner need only identify a valley for each bar, and not the width of that bar based on the width of the valley in the wave form. As a result, single-width element symbologies allow for slightly better reader performance at the expense of decreased information density.

Recently, a single width symbology called BC412 was disclosed in U.S. Pat. No. 5,380,998 by Bossen et al. and assigned to IBM. The BC412 symbology was applied to the area of semiconductor wafer marking because of the ease of making single width marks. In this symbology, the bars have a variable width while the spaces, which are etched, have a single width. The symbology follows a pattern derived from the (12,4) n,k set where all the spaces wider than one module are eliminated. The resulting character set contains only 35 patterns, which is not quite sufficient to fully represent the complete alpha-numeric character set. A fully alphanumeric character set must contain, at a minimum, 36 patterns to encode the data characters A–Z and 0–9. The BC412 symbology employs the same symbol character to encode both of the data characters "0" and "O", and is therefore not fully alphanumeric.

The start and stop patterns of the BC412 symbology employ three or four elements and thus are smaller than the data characters which employ eight elements. The advantage of a three or four element start and stop pattern is that it has a small printing area. The start and stop patterns are virtually identical to the start and stop patterns in one version of the 2 of 5 code and in the well-known "Interleaved 2 of 5" symbology. Consequently, a disadvantage of the small start/stop pattern in the BC412 symbology is the chance of mistaking a BC412 symbol for a symbol from a different symbology. Another disadvantage of the small start/stop symbol characters in the BC412 symbology is that any symbol must have a fixed length (i.e., a fixed number of symbol characters) to eliminate the possibility of a "short scan," i.e., where a scan beam exits the symbol prematurely, yet is decodable as a symbol with fewer characters.

Assuming the BC412 symbology employs some checking scheme, any such checking scheme would be inefficient. As is known, data characters encoded under nearly all symbologies can result in errors when decoded by a laser scanner or other bar code reader. To reduce errors, certain symbologies include check characters. A "check character" is a symbol character included within a given bar code symbol (usually at the end of the symbol characters, although placement is not important to its function) whose value is used to perform a mathematical check that determines whether the symbol has been decoded correctly.

For example, the known Code 39 symbology has an optional modulo 43 check character that can be included as the last symbol character in a symbol. The Code 39 check character is calculated by determining a character value for each data character in an original message, adding together all of the character values, and dividing the sum by 43. The check character becomes the remainder that results from such division, and is appended to the end of a symbol encoded from the message. A "character value" is a number representing a data character in a given symbology. For example, in the Code 39 symbology, the data character "A" has a character value of "10".

The Code 39 symbology employs 43 symbol characters, which is a prime number of symbol characters. Therefore, using modulo 43 mathematics to generate a check character, a unique check character for any given series of data characters will always result. The U.P.C. symbology, however, employs a modulo 10 check character. Since 10 is a non-prime number having factors of 1, 2 and 5, and therefore a modulo 10 checking scheme can provide two different check characters for a given string of data characters. As a result, the U.P.C. symbology application environment employs a data base having a look up table to compensate for such a shortcoming of the checking scheme.

The BC412 symbology similarly does not include a prime number of characters. Consequently the effectiveness of the check character is greatly diminished. Non-unique check characters can be generated, which results in less effective error detection for the BC412 symbology. However, the BC412 symbology is apparently designed for use on semiconductor wafers. Prior manual methods of marking semiconductor wafers included etching alphanumeric characters, which were then read and input manually. Therefore, the lack of high quality error detection is still superior to prior manual methods of reading data from the wafers.

Some of the above disadvantages of the BC412 symbology are minimized in the application of the symbology to wafer marking. The data to be encoded is of a fixed length, which allows a reader to reject short scans. The data character fields in the symbology are restricted to allow the "0" numeric character to be used when an "O" alpha character is needed. A reader can be restricted to read only one symbology thereby eliminating the chance of an autodiscrimination error. "Autodiscrimination" refers to the ability of a bar code scanner or reader to recognize and correctly decode more than one symbology.

Additionally, when a BC412 symbol is viewed in a slightly out-of-focus position, groups of narrow elements are unresolved and appear to have the same contrast leading to misinterpretation as wide bars. Consequently, due to the simple nature of the start and stop symbol characters employed in the BC412 symbology, the symbology is open to frequent autodiscrimination errors with other popular symbologies such as Code 39, Interleaved 2 of 5 and Code 128, to name a few.

Overall, the inventor is unaware of a single width element symbology that is fully alphanumeric. The inventor is also unaware of a single width element symbology capable of providing full ASCII and extended ASCII. Additionally, the inventor is unaware of such a symbology capable of eliminating autodiscrimination problems. Furthermore, the inventor is unaware of such a symbology employing an error detection scheme capable of providing exceptional data security. Lastly, the inventor is unaware of any symbology of any type that allows a standard bar code reader to determine the relative focus state of the reader.

SUMMARY OF THE INVENTION

The present invention embodies a single width element symbology that employs specific start/stop characters that allow for bidirectional scanning and focus determination, and that allows for variable length high density symbols which can be used in open environments with a high degree of data integrity. "Open environments" refers to symbols that can be printed by any number of known bar code printers and then decoded anywhere using known bar code scanners or readers, such as readers having electro-optical devices such as linear or two-dimensional CCDs, laser scanners, wands, rasterizing lasers, or other similar electro-optical devices known by those skilled in the art. In one aspect, the present invention provides a bar code symbology with one of the two element types (bar or space) being a fixed width. By fixing the width of one of the element types, the printing and reading process is simplified especially when the symbology is printed with a small X-dimension. The "X-dimension" is defined as the average of the widths of the narrowest bar and the narrowest space in a given symbol. The present invention embodies a reader that decodes the symbology of the present invention, which is programmed to take advantage of a less complex pattern thereby providing better reading performance over known readers. Such improved reading performance is especially evident when the symbol is dirty or distorted by optical interference as is the case with over-laminate materials which may be used to protect the symbol.

In another aspect, the invention embodies a symbol character set of the n,k family of (13,4), which is particularly appropriate for use in marking items with a single width element symbology. The (13,4) symbol character set of the present invention is generated by eliminating all of the bars (or spaces) greater than one width, while allowing the spaces (or bars) to have a variable width. By eliminating all wide bars in the present (13,4) symbology, 56 symbol characters result, which allows for a alphanumeric character set of 43 characters. These 43 alphanumeric characters, having character values 0–42, can map directly to the character values in other popular symbologies such as Code 39 and Code 93. As a result, the present symbology is readily compatible with data transfers with popular symbologies.

Additionally, the present symbology employs shift, latch and four function characters that have exceptional utility such as the function characters in the Code 128 symbology. Additionally, the full and extended ASCII character sets can be defined as the combination of latch and shift characters. A "latch character" changes the meaning of all subsequent characters whereas a "shift character" changes the meaning of only the next character. The present symbology is a self-clocking symbology in that each symbol character has a fixed width (i.e., 13 modules wide). The fixed width symbol character set allows the reader to reset or "clock" at the beginning of every character thereby allowing immunity to variable accelerations in the scanning process.

In a further aspect of the invention, a numeric compression method is included which allows 5 numeric digits to be compressed into only three symbol characters. The addition of a numeric compression method under the present invention, with a corresponding symbol character initiating such method, allows numeric data to be encoded in a bar code symbol that produces a symbol that is shorter than all other single width bar code symbologies. For instance, a string of only ten digits, negates the density advantage of BC412's short start/stop characters without inflicting the data security or loss of flexibility shortcomings from which BC412 suffers. Longer strings of digits, such as is commonly found in manufacturing and distribution environments, allows the present symbology to exhibit great information density advantages especially when printed with an X-dimension of less than 0.004 inches.

In a still further aspect, the present invention embodies a method of error detection that utilizes the entire character set, except for the start and stop characters, but which has the advantage of being based on a prime number. Symbology checking schemes have been found to be more powerful if the modulo is a prime number. The use of modulo 53 by the present invention is unique and has certain advantages with the character set described in this invention.

Yet another aspect of the present invention is the use of robust start and stop characters. "Robust" means that the start and stop characters are unique members of the symbol character set and therefore occur only at the ends of a valid symbol. Consequently, the problem of short scanning is eliminated since a reader must recognize both start and stop characters in a given symbol. More importantly, the particular start and stop characters of the present invention are both unique and allow the reader to determine if the reader is out-of-focus, therefore the possibility of autodiscrimination errors are practically eliminated, whereby the symbology of the present invention can be used in any environments currently containing symbols from any of the various popular symbologies in use today.

BRIEF DESCRIPTION OF THE DRAWINGS

FIG. 1 shows a table representing the symbol characters of the symbology of the present invention, and the corresponding data characters and character values for the symbol characters.

FIG. 2 shows a symbol character under the present invention that corresponds to the data character "Start 0" and the character value of 53.

FIG. 3 shows a symbol character under the present invention that corresponds to the data character "Start ns" and the character value of 54.

FIG. 4 shows a symbol character under the present invention that corresponds to the data character "Stop" and the character value of 55.

FIG. 5 shows a symbol character under the present invention that corresponds to the data character "Function 1" and the character value of 49.

FIG. 6 shows a symbol character under the present invention that corresponds to the data character "Function 2" and the character value of 50.

FIG. 7 shows a symbol character under the present invention that corresponds to the data character "Function 3" and the character value of 51.

FIG. 8 shows a symbol character under the present invention that corresponds to the data character "Function 4" and the character value of 52.

FIG. 9 shows a symbol character under the present invention that corresponds to the data character "Shift 1" and the character value of 43.

FIG. 10 shows a symbol character under the present invention that corresponds to the data character "1" which corresponds to the character value of 1.

FIG. 11 shows a symbol character under the present invention that corresponds to the data character "A" and the character value of 10.

DETAILED DESCRIPTION OF THE INVENTION

Figure 12:
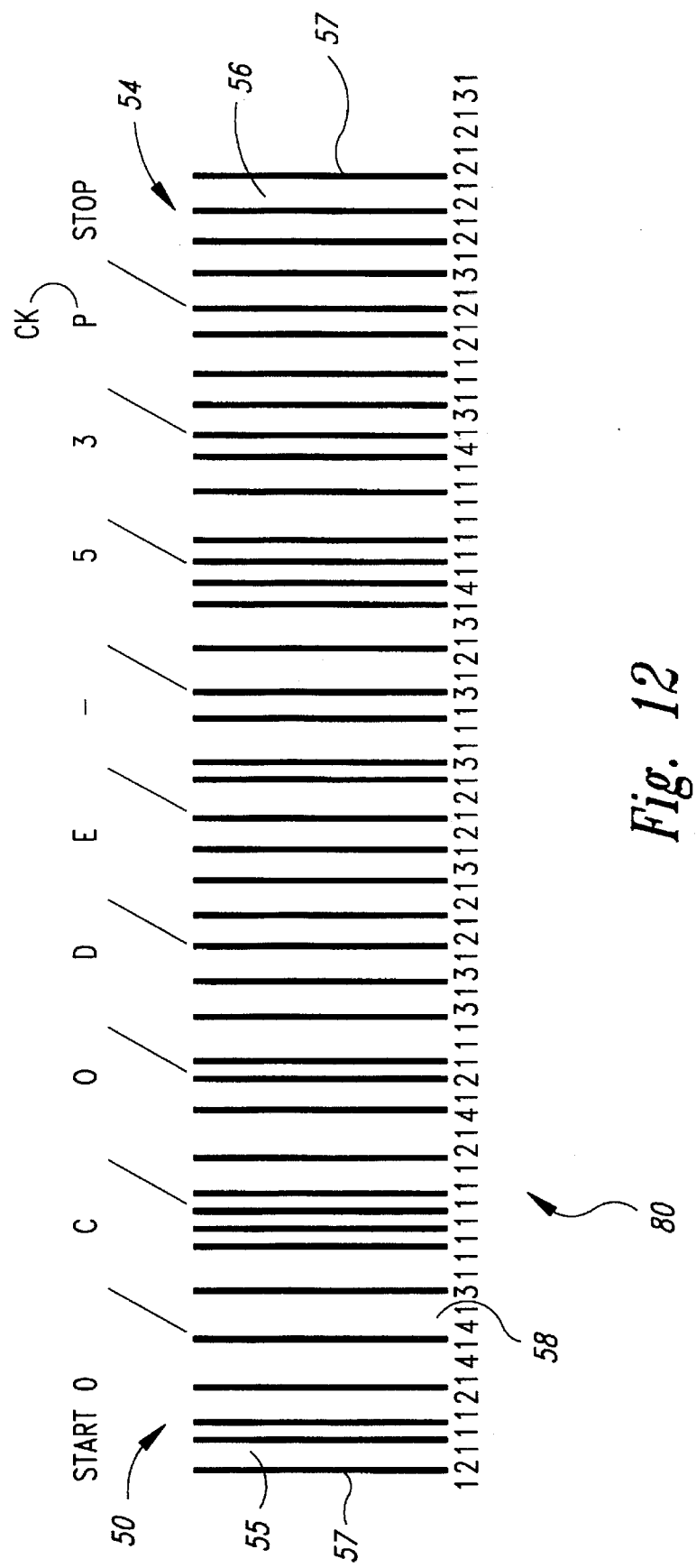
FIG. 12 shows a bar code symbol under the symbology of the present invention having approximately an 40 mil X-dimension and that encodes the data characters "C", "0", "D", "E", "space", "5", "3", the "Start 0" character, a modulus 53 check character and the "Stop" character.

The symbology of the present invention is shown in the table of FIG. 1, where each bar under the columns having a heading of "b", are one module wide, and are thus represented by a "1". On the other hand, the spaces, under the columns having a heading of "s", have a width of between 1 and 6 modules. Every symbol character under the symbology of the present invention contains a total number of four bars and four spaces, and each symbol character is 13 modules wide as can be seen by adding up the numbers in any row (except the last) in the table of FIG. 1. All other symbol characters are excluded, leaving a total of 56 characters. Consequently, as shown in the table of FIG. 1, the symbology of the present invention is based on a (13,4) character set that employs only symbol characters having one-wide bars. As a result, in each symbol character, the total width of all spaces equals nine, since the total width of all bars is equal to four. Alternatively, the symbology of the present invention can be readily changed to provide only one-wide spaces, with variable width bars.

The symbology of the present invention provides many important advantages described below. By employing bars having only a single width, the symbology of the present invention may be readily printed, since only 1-wide bars between variable width spaces need to be formed on a surface. By employing 13 modules per symbol character, the present symbology is able to encode the full ASCII and extended ASCII character sets, while providing significant information density. Fifty-three of the total 56 symbol characters are used to encode data characters. The 53 symbol characters are also used as check characters under a prime modulo 53 method described below to provide a high level of data security.

As shown in the exemplary symbols of FIGS. 2 through 11, the symbology of the present invention employs only one-wide bars 57. Of the 56 symbol characters, 3 symbol characters are used for a Start 0 character 50, a Start ns character 52 and a Stop character 54 (FIGS. 2, 3 and 4, respectively), 4 symbol characters are used for Function characters 60, 62, 64 and 66 (FIGS. 5, 6, 7 and 8, respectively), and 6 symbol characters are used for shift and latch data characters (e.g., shift 1 character 70 of FIG. 9). The remaining 43 symbol characters encode the data characters "0" through "9" (e.g., symbol character 72 of FIG. 10), the data characters "A" through "Z" (e.g., symbol character 74 of FIG. 11), and other data characters shown in FIG. 1. The string of numbers below each symbol charcter in FIGS. 2 through 11 and in the other symbol characters shown herein, sequentially list the width of elements in the corresponding symbol character or symbol. The 43 symbol characters that correspond to the alphanumeric data charcters have the same charcter values, and are represented in the same order, as similar alphanumeric data characters in the Code 39, Code 93 and Code 49 symbologies. As a result, the symbology of the present invention is capable of exchanging data from the present symbology to other popular symbologies, and vice versa, without significant processing overhead that otherwise might be required.

The Start 0, Start ns and Stop symbol characters 50, 52 and 54 meet several criteria. The Stop symbol character 54 is unique and therefore easily distinguished from start or stop symbol characters in any other symbology. As a result, a reader reading a symbol of the present invention will readily distinguish it from other symbologies, thereby avoiding autodiscrimination errors.

The Stop character 54 has a bar and space pattern that can be recognized by all electro-optical readers even when slightly out-of-focus. As shown in FIG. 4, the Stop character 54 employs three two-wide spaces 55 followed by a final three-wide space 56. The Stop character 54 includes a fourteenth module, a one-wide bar 57, that defines and separates the three-wide space 56 from the subsequent quiet zone. The "quiet zone" is a clear area, containing no dark marks, that precedes or follows a symbol.

If the Stop character 54 was slightly out-of-focus, the one-wide bars 57 would become unresolved, but the two-wide and three-wide spaces 55 and 56 would remain resolved. Most readers would recognize that the final space is the three-wide space 56 since the signal from the reader would provide a width having a greater amplitude than the amplitudes of the widths produced by the two-wide spaces 55.

A reader can determine scan direction more rapidly if the last element (a space) is wider than the preceding elements. The Stop character 54 employs the three-wide space 56 following three two-wide spaces 55, and therefore, a reader can readily determine the direction of scan. If a scan results in the three-wide space 56 before the two-wide spaces 55, then the reader knows that the scan was performed in a reverse direction (i.e., "reverse scan").

The Start 0 and Start ns characters 50 and 52 (FIGS. 2 and 3) can similarly be distinguished from start or stop characters in any other symbology when both in or out-of-focus because they each employ an initial two-wide space 55 and a terminating four-wide space 58. Both the two-wide and four-wide spaces 55 and 58 will be recognizable by most readers when the symbol is out-of-focus, even though the remaining one-wide bars 57 and one-wide spaces 59 therebetween will be unresolved.

The Start 0 and Start ns characters 50 and 52 each have a sequence of three one-wide elements (i.e., two one-wide bars 57 separated by a one-wide space 59). These sequences of three one-wide elements help a standard reader determine if a given symbol is in focus. In other words, if the reader is able to recognize the individual one-wide elements in the Start character 50 or 52, then the reader recognizes that the remaining symbol characters in the symbol are likely in focus. The Start characters 50 and 52 employ the final four-wide space 58 to help delineate the end of the Start character and the beginning of the data characters in a given symbol.

The symbology of the present invention employs two Start characters, the Start 0 character 50 and the Start ns character 52, to improve the information density of the present symbology. As explained below, the shift or latch data characters are used to shift into one of three data character sets. For typical alphanumeric encoding, the Start 0 character 50 is employed which indicates to a reader that the first data character that follows is from a Code Set 0, shown in FIG. 1. For encoding numbers, however, a symbol employs the Start ns character 52, which indicates that the symbol characters that follow were produced by the below-described numeric compaction method to compress five numeric digits into three symbol characters, thereby realizing greater information density. The Start 0 and Start ns characters 50 and 52 are explained by way of example more fully below.

The Function characters 60, 62, 64 and 66 in FIGS. 5, 6, 7 and 8, (represented by "F1", "F2", "F3" and "F4" in FIG. 1) provide special functions established for a given reader or industry, all respectively. Alternatively, the Function characters 60 through 66 could provide the same functions as function characters employed in other symbologies, such as the Code 128 symbology. The function characters employed by other bar code symbologies are rarely used. Therefore, the Function characters 60 through 66 of the present symbology employ a six-wide space 67 (the widest element in the symbology) so that they are easily recognizable from other symbol characters in the symbology. Additionally, the position of the six-wide space 67 has a position that corresponds to the particular Function character. For example, the first space in the Function 1 symbol character 60 (FIG. 5) is the six-wide space 67. Conversely, the fourth space in the Function 4 symbol character 66 (FIG. 8) is the six-wide space 67.

The symbology of the present invention allows the 43 symbol characters to represent or map onto the full ASCII and extended ASCII data characters. As shown in FIG. 1, the symbology of the present invention employs three Code Sets. Code Set 0 is the default or unshifted Code Set that includes the upper case alpha characters. Code Set 1, the first shifted or latched character set, includes the lower case alpha characters, while Code Set 2, the second shifted or latched character set, includes the remaining ASCII data characters. The assignment of the full ASCII data characters is identical to the Code 49 symbology where 43 data characters in each set (i.e., Code Sets 0, 1 and 2) are mapped between the symbologies. For example, the data character "r" and "2" in Code Sets 1 and 2, respectively, have the character value 26 in both the present symbology and the Code 49 symbology. As a result, the symbology of the present invention is capable of exchanging data from the present symbology to the Code 49 and other symbologies without significant computer or microprocessing overhead that would otherwise require a lookup table or other interface if the character values did not directly map between the symbologies.

The shift 0, shift 1 and shift 2 characters (represented by "^0", "^1" and "^2" in FIG. 1) generally indicate that the subsequent symbol character represents a data character from the Code Set corresponding to the shift character (i.e., the shift 1 character indicating that the subsequent symbol character represents a data character in Code Set 1). The shift characters have an additional function whereby if a shift character is encountered when the identical Code Set is currently selected, then the shift character indicates a return to the Code Set 0 for one character. When the Shift 0 character is encountered while the Code Set 1 or 2 is currently selected, then the following two characters are from Code Set 0. If the current Code Set is 0, and the shift 0 character is encountered, then two characters from the Code Set 1 are shifted into the character string.

In addition to the shift characters, two latch characters (represented by "l1" and "l2" in FIG. 1) are included to efficiently encode long strings of characters from the shifted character sets (i.e., Code Sets 1 and 2). For example, assuming that a reader is currently interpreting data characters from Code Set 0, the data character "l1" causes the reader to interpret all subsequent characters as being from Code Set 1. The subsequent use of any latch character causes the current Code Set to revert back to Code Set 0, the capital alpha data character set. The present symbology also employs an "ns" character which latches subsequent symbol characters into a 5 for 3 base 48 numeric compression method described below. The "ns" character toggles into and out of the numeric compaction method.

The symbol characters in the symbology of the present invention are pseudo-randomized to reduce the occurrence of similar data types matching to similar patterns of bars and spaces. Under the BC412 symbology, a slight change in the width of a given variable width element would still provide a data character of the same type (e.g., a slight change in the width of a space in a symbol character representing a numeric data character will still produce a numeric data character). An exemplary computer software program presented below, written in the known BASIC programming language, generates the complete symbol character set of the present invention pursuant to the designs specified herein.

```
OPEN "c:\Code53.set" FOR OUTPUT AS #1
n = 0
a = 1:c = 1:e = 1:g = 1
FOR d = 5 TO 1 STEP-1
  FOR h = 1 TO 5
    FOR f = 5 TO 1 STEP-1
      FOR b = 5 TO 1 STEP-1
IF a + b + c + d + e + f + g + h = 13 THEN
  IF b = 2 AND d = 1 THEN 'excludes Start 0 character
    IF f = 2 AND h = 4 THEN
      GOTO 100
    END IF
  END IF
  IF b = 2 AND d = 2 THEN 'excludes Start ns and Stop characters
    IF f = 1 AND h = 4 THEN
      GOTO 100
    END IF
    IF f = 2 AND h = 3 THEN
      GOTO 100
    END IF
  END IF
  PRINT n, a; b; c; d; e; f; g; h
  PRINT #1, n; " "; a; b; c; d; e; f; g; h
  n = n + 1
100 END IF
    NEXT b
   NEXT f
  NEXT h
NEXT d
FOR b = 6 TO 1 STEP-5 'generates Function characters
  FOR d = 6 TO 1 STEP-5
    FOR f = 6 TO 1 STEP-5
      FOR h = 6 TO 1 STEP-5
IF a + b + c + d + e + f + g + h = 13 THEN
PRINT n, a; b; c; d; e; f, g; h
PRINT #1, n; " "; a; b; c; d; e; f; g; h
n = n + 1
END IF
  NEXT h
```

```
    NEXT f
   NEXT d
 NEXT b
 b = 2 'generates Start and Stop characters
 FOR d = 1 TO 2
   FOR f = 1 TO 2
     FOR h = 3 TO 4
 IF a + b + c + d + e + f + g + h = 13 THEN
 PRINT n, a; b; c; d; e; f, g; h
 PRINT #1, n; " "; a; b; c; d; e; f; g; h
 n = n + 1
 END IF
   NEXT h
  NEXT f
 NEXT d
```

Figure 13A:
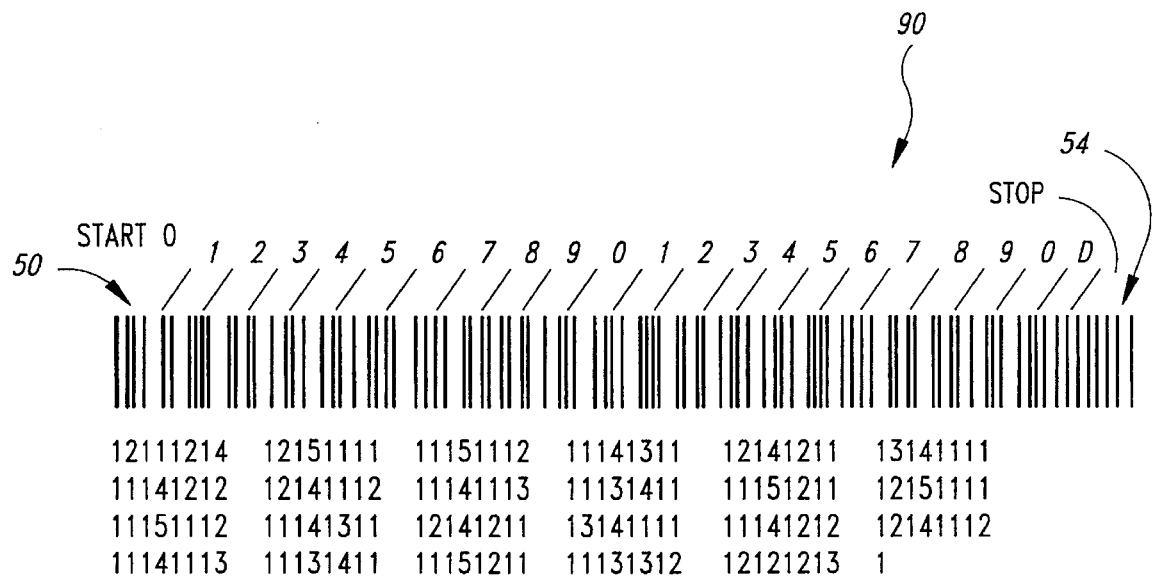
FIG. 13A shows a bar code symbol under the symbology of the present invention having a 20 mil X-dimension and directly encoding the data characters "12345678901234567890".
Figure 13B:
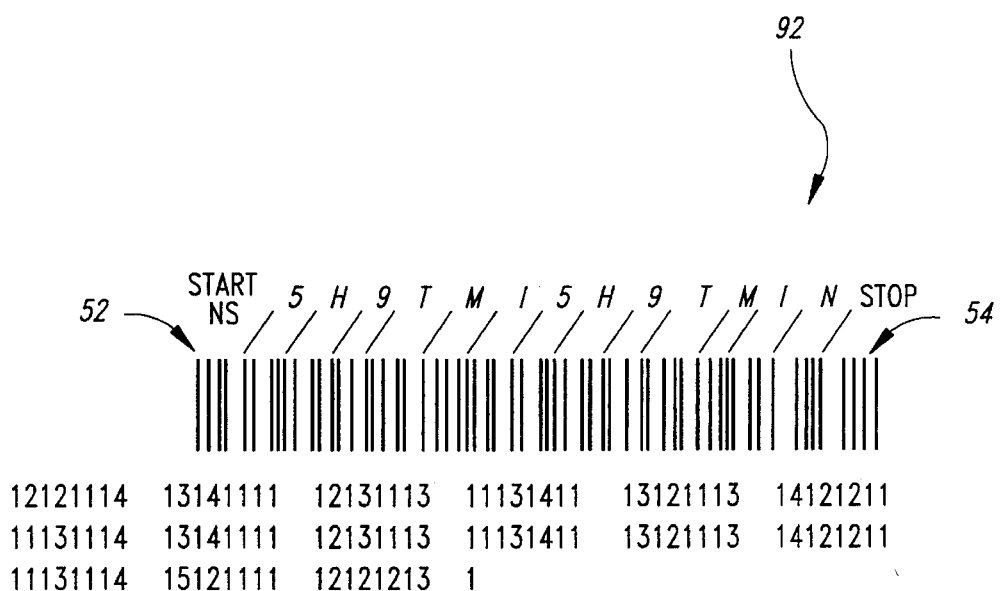
FIG. 13B shows a bar code symbol under the symbology of the present invention encoding the data characters of FIG. 13A using the numeric compression method of the present invention.

Examples of symbols 80, 90 and 92 encoded under the symbology of the present invention are displayed in FIGS. 12, 13A and 13B, respectively. The symbol, 80, 90 and 92 show each symbol character, which has 4 bars and 4 spaces, delineated by way of a diagonal mark at the top of the character, extending away from the last space of the character, which is added herein only for the purposes of illustration. The data characters for each symbol 80, 90 and 92 are shown above their corresponding symbol character. The widths of the elements in the symbol 80 are shown below as a string of digits sequentially representing the widths of the elements in the symbol. For the symbols 90 and 92, the widths of the elements are shown as groups of digits parsed into the widths for individual symbol characters.

Referring to FIG. 12, the first symbol character in the symbol 80 is the Start 0 character 50 and has the string of element widths of 12111214. The Start 0 character 50 indicates that the symbol is a member of the present symbology and that the first character following thereafter is from the Code Set 0. Each subsequent character is identified including a check character "ck" and the Stop character 54.

The check character "ck" is computed and verified using the following method which has a prime modulo of 53. The data is first listed with a weighting starting with 1 for the Start characters 50 or 52 then starting with 1 again for the first data character and progressing for each data character to the right in increments of 1. The character values for each data character are determined from the character sets in FIG. 1 and multiplied by the weightings. The resultant products are summed and the modulo 53 value is determined. The symbol character that matches the modulo 53 value is placed in the penultimate symbol position, i.e., before the stop character 54, but could be placed anywhere in the symbol and perform equally well. Finally, the Stop character 54, which is 14 modules wide, is added to complete the symbol 80. A summary of the check calculation is indicated below:

| Data Characters | Start 0 | C | O | D | E | space | 5 | 3 | ck |
|---|---|---|---|---|---|---|---|---|---|
| Character Value | 53 | 12 | 24 | 13 | 14 | 38 | 5 | 3 | |
| Weights | 1 | 1 | 2 | 3 | 4 | 5 | 6 | 7 | |

(1×53)+(1×12)+(2×24)+(3×3)+(4×14)+(5×38)+(6×5)+ (7×3)=449, modulo 53 of 449 equals 25 which is the character value for the data character "P".

The symbology of the present invention employs the largest prime number of symbol characters in the symbology as the base modulo number (i.e., 53). Symbol characters greater than 53 are reserved for the Start 0, Start ns and Stop characters 50, 52 and 54, which are not included in a data message encoded in a given symbol. As a result, the symbology of the present invention provides a high degree of data security.

The symbols 90 and 92 in FIGS. 13A and 13B show how numeric data is encoded under the symbology of the present invention. The numeric data characters encoded into the symbol 90 of FIG. 13A are "12345678901234567890", or twenty data characters. The compressed data character string that results from the following method is "5H9TMI5H9TMI", or twelve data characters, shown in the symbol 92 in FIG. 13B. By comparing the uncompressed symbol 90 of FIG. 13A that directly encodes the 20 numeric data characters, to the compressed symbol 92 of FIG. 13B, one can visually realize that the numeric compression method of the present invention realizes a space savings of approximately 40%.

In the numeric compression mode, a string of five digits are represented as three data characters, each of which can assume any character value 0 through 47 based on the following equation:

$$(48)^2 C_1 + 48 C_2 + C_3 = [\text{5-digit numeric string}] \quad (1)$$

where $C_1$, $C_2$ and $C_3$ represent three character values. Whenever the number of numeric digits to be encoded into a symbol is a multiple of 5+1, the last numeric digit in the total number of digits is represented by a single data character (and thus a single symbol character). Whenever the number of numeric digits to be encoded is a multiple of 5+3, the last three digits are represented by two symbol characters, with the last three digits in the numeric string being equal to $48 C_1 + C_2$.

Whenever the total number of numeric digits to be encoded is a multiple of 5+4, the last four numeric digits are represented by three symbol characters, with the weighted value of the three symbol characters being 100,000 plus, the four digit number to be represented. Whenever the total number of digits to be encoded is a multiple of 5+2, the last seven digits in the total number of digits are considered to be four digits followed by three digits, and are represented by three and two symbol characters, respectively.

Applying the above method to the exemplary twenty digit data character string "12345678901234567890", the method takes the first five digits "12345" and divides the amount by $48^2$ to produce a result of 5, remainder 3581. Five, therefore, becomes the character value for the first of three symbol characters that represent the first five numeric digits in the 20 digit data character string. Five times $48^2$ is then subtracted from the five digits to produce the result (i.e., 12345−($48^2$× 5)=825). The resultant value is divided by 48 to produce 17, remainder 9. Again, 17 is multiplied by 48 and subtracted from the previous value of 825 to produce the final character value of 9. Therefore, the first five digits in the 20 digit character string are represented by the character values 5, 17 and 9, which correspond to the data characters "5", "H", and "9" in Code Set 0.

The method proceeds with the next five digits of "6", "7", "8", "9", and "0", which are converted into the character values 29, 22 and 18 under the same method. The character values 29, 22 and 18 correspond to data characters "T", "M", and "I" respectively. The next ten digits are similarly converted into the same data characters "5H9TMI". The check character, produced by the above modulo 53 method, provides a character value of 23, which corresponds to the data character "N". The resulting string of data characters and their corresponding symbol characters are shown in the symbol 92 in FIG. 13B.

Figure 14:
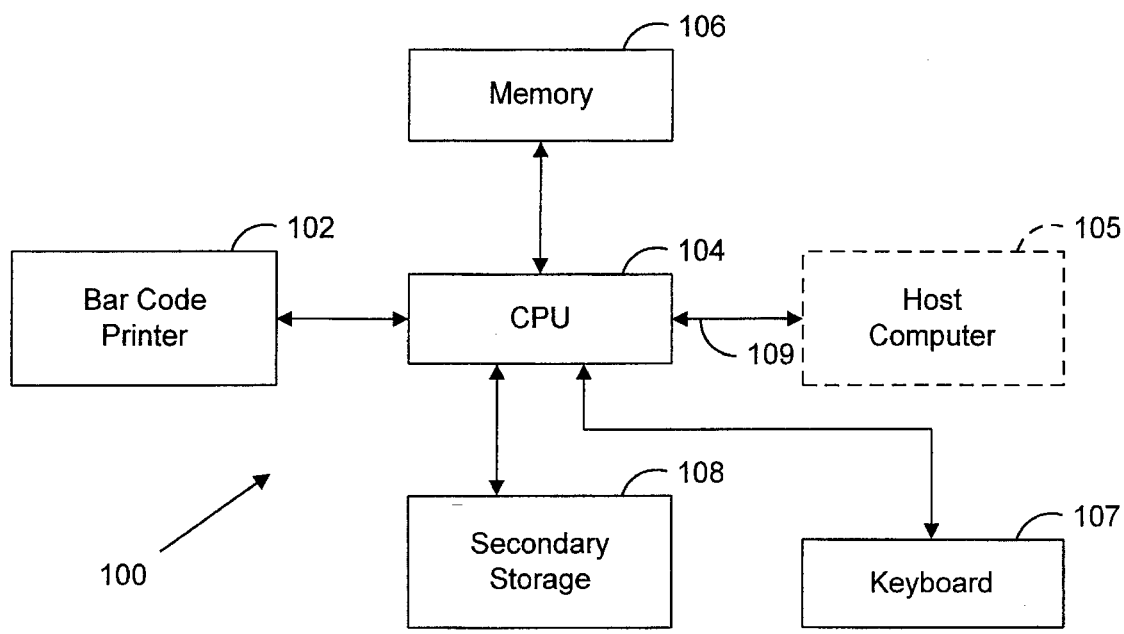
FIG. 14 is a block diagram of a bar code symbol printing apparatus of the present invention.

The symbology of the present invention can be readily printed using a printer such as a bar code symbol printing apparatus 100 shown in FIG. 14. The printing apparatus 100 consists of a bar code printer 102, a central processing unit ("CPU") 104, a memory 106, a keyboard 107 and a secondary storage 108. The bar code printer 102 is of a type generally known which can print bar codes, and preferably also human readable characters. Those skilled in the art can select from any such bar code printers which print or mark bars on a surface and which are suitable for the present invention. Importantly, the symbology of the present invention employs only single-width bars, which are separated by variable width spaces. Therefore, the printer can be quite simple in construction, since it need only print bars of a single width. The printer 102, however, must be capable of appropriate spacing the widths between the bars to define the variable width spaces. Preferably, the bar code printer 102 prints the bars and the 1-wide spaces so that they have the same width. However, due to printing errors, the widths of the bars and spaces often vary from the ideal.

The CPU 104 can be electrically coupled to a host computer 105, or other apparatus or applications, by a port or line 109. The CPU 104, executing appropriate instructions stored in the memory 106 and/or the secondary stored 108, converts data characters, such as those input by the keyboard 107, into counts which are sent to the bar code printer 102. "Counts" refer to a unique set of electrical symbols necessary for printing, or produced when reading, a symbol character that corresponds to a data character in a given symbology. The bar code printer 102 interprets these counts and converts them into printed bar code symbols, typically in the form of bar code labels. A "bar code label" generally refers to any paper, cloth, plastic, metal or other pliable or rigid material suitable for having symbol characters and/or data characters printed thereon. Those skilled in the relevant art, however, will recognize that the term bar code label also refers to symbols printed directly on an object, such as packaging for a consumer product.

Figure 15:
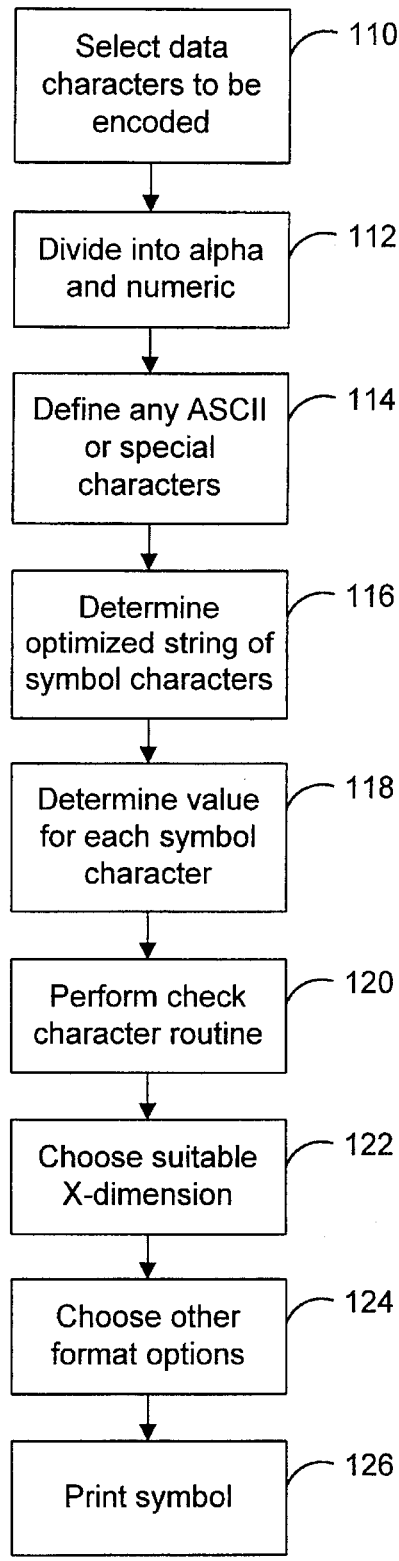
FIG. 15 is a flow chart showing the basic steps performed by the printing apparatus of FIG. 14 for printing bar code symbols under the symbology of the present invention.

FIG. 15 shows the steps performed by the printing apparatus 100 of FIG. 14 for printing a bar code label having multiple symbol characters. In step 110, a string of data characters are selected, input or determined, for example, such as input using the keyboard 107. The string of data characters may also be input to the CPU 104 over the line 109 from the host computer 105. When a key is depressed on the keyboard 107, the keystroke is converted into a "scan code" which is transmitted from the keyboard to the device to which the keyboard is connected (e.g., the printing apparatus 100 or the host computer 105). This scan code represents the particular key of the keyboard which has been depressed, and is unrelated to any particular character or code in a character set, such as ASCII.

In step 112, the CPU 104 divides the selected characters into alpha characters and numeric characters. In step 114, the CPU 104 defines any ASCII or special characters, such as shift, latch or function characters. In step 116, the CPU 104 determines an optimized string of symbol characters based on the selected data characters. For example, if more than five consecutive data characters are numeric, then the CPU 104 determines that the numeric compaction mode should be employed to reduce the number of symbol characters and thereby increase information density of the resulting symbol.

In step 118, the CPU 104 determines the character value for each data character based on the table of FIG. 1. The table of FIG. 1 is preferably stored in the secondary storage 108, along with the counts for the corresponding symbol characters. In step 120, the CPU 104 generates the check character by employing the above-described check character routine. In step 122, the CPU 104 chooses a suitable X-dimension for the symbol based on, in part, the number of symbol characters to be printed. In step 124, the CPU 104 chooses other format options, such as printing the symbol with the human readable data characters, or other format options known by those skilled in the art. In step 126, the CPU 104 outputs the appropriate codes and other signals to the bar code printer 102, which in turn prints the symbol as a series of symbol characters to form the bar code label.

Figure 16:
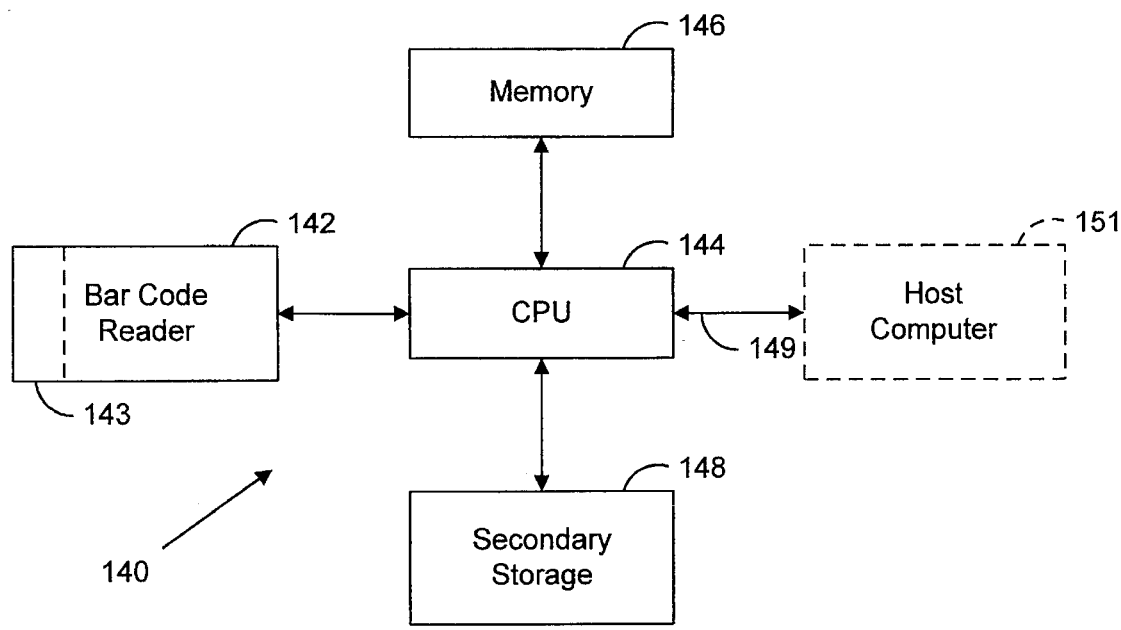
FIG. 16 is a block diagram of a bar code symbol reading apparatus of the present invention.

The symbology of the present invention can also be readily read using a bar code reading apparatus such as a bar code reading apparatus 140, shown in FIG. 16. The reading apparatus 140 has a standard bar code reader 142. The bar code reader 142 includes an electro-optical device 143 such as a laser scanner, rasterizing laser, or wand-based optical transducer. Alternatively, the electro-optical device 143 in the reader 142 can include a one- or two-dimensional CCD, semiconductor array, vidicon, or other area imager capable of converting received light into electrical signals. The electro-optical device 143 in the reader 142 can also include a light source such as an LED, flash bulb, infrared light source, or other light-emitting element. As used generally herein, the term "reader" refers to any device capable of converting modulated light received from a bar code into electrical signals. Readers are known by those skilled in the art, and any such reader suitable for use in the present invention can be selected. The data read from the bar code reader 142 is input to a CPU 144. A memory 146 and a secondary storage 148 are coupled to the CPU 144. The data input to the bar code reader 142 is processed by the CPU 144 and output to a host computer 151, or other apparatus or applications, by a port or line 149.

Figure 17:
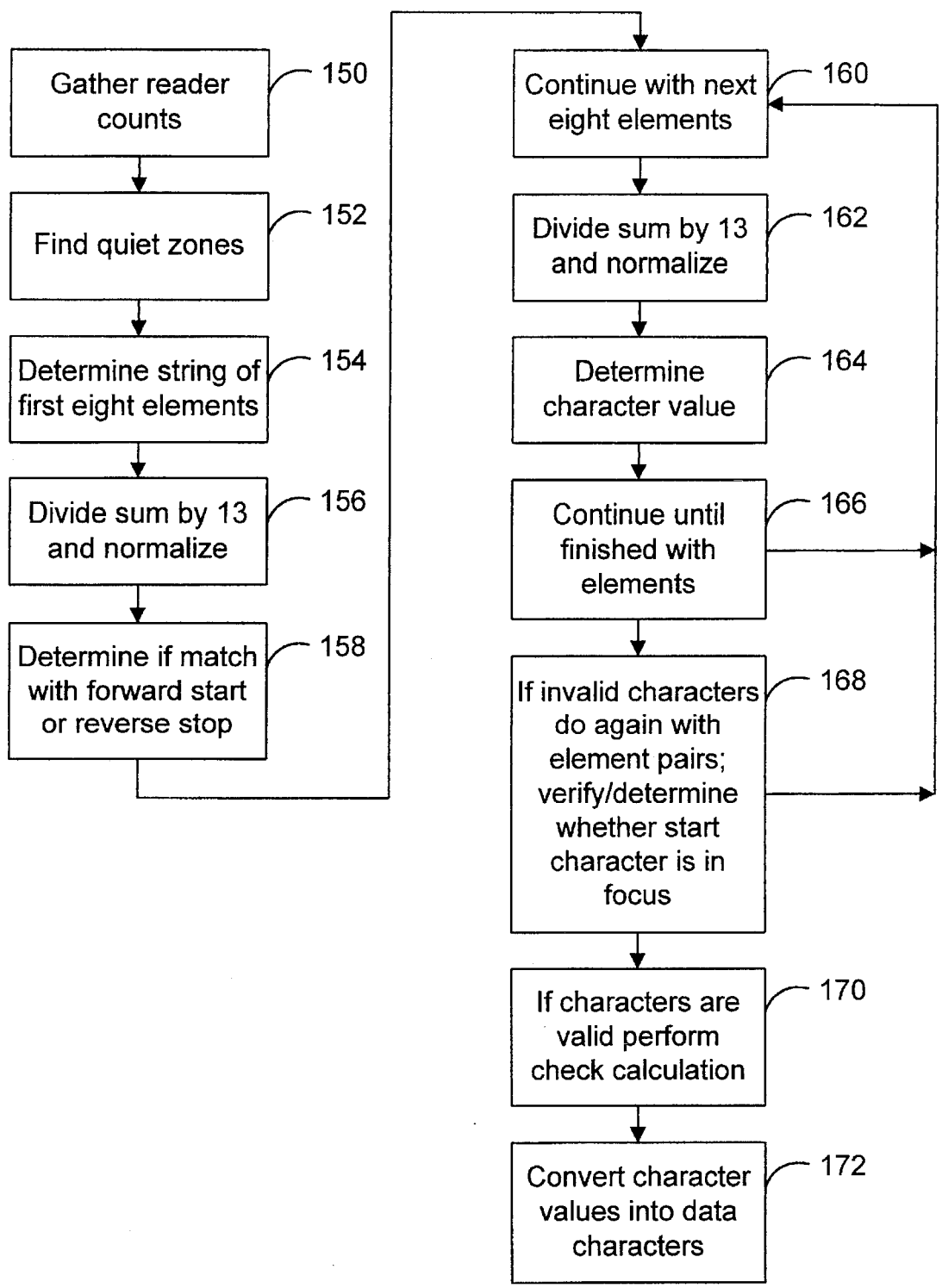
FIG. 17 is a flow chart showing the basic steps performed by the reading apparatus of FIG. 16 for reading bar code symbols from the symbology of the present invention.

FIG. 17 shows the steps performed by the reading apparatus 140 of FIG. 16 for reading bar code symbols having symbol characters from the present symbology. In step 150, the bar code reader 142 scans or images the symbol characters of a bar code label and determines a series of counts. As is known by those skilled in the art, the transitions between bars in the symbol characters, together with a timer within the reading apparatus 140, determines the counts of the symbol characters read. The counts in turn are used to determine the widths of elements in a given symbol. In step 152, the CPU 144 analyzes the counts, to locate the quiet zones on both sides of the symbol.

In step 154, the CPU 144 selects the first eight sets of counts, which represent the first string of 8 element widths. In step 156, the CPU 144 divides the first eight sets of counts by 13 and normalizes the result to estimate the widths of the individual elements. Since the bars all must have the same width, the CPU 144 can more readily determine the widths of the elements in the first symbol character. In step 158, the CPU 144 compares the widths of the first 8 elements to the string of widths for the Start characters 50 and 52 and with the reverse string of widths for the Stop character 54. If the first 8 elements in the string correspond to the 8 elements from the Stop character 54, but in reverse, the CPU 144 recognizes that the symbol has been scanned in reverse, and therefore recognizes that the symbol is to be read from right to left (as opposed to the traditional left to right).

In step 160, the CPU 144 selects the next 8 elements, and in step 162, divides the sum of the elements (counts) by 13 and normalizes the result. In step 164, the CPU 144 determines the character value for the selected 8 elements. In step 166, the CPU 144 determines if the symbol contains any additional elements and if so, loops back to step 160 to perform the steps 160 through 164 again until all of the symbol characters have been converted into character values.

In step 168, the CPU 144 determines if any invalid/undecodable characters have been generated. If some symbol characters are determined to be undecodable, then the routine loops back to step 160 and the CPU 144 performs other known decode methods, such as edge-to-edge (element pairs) decoding for individual elements in the symbol. Alternatively, in step 168, the CPU 144 performs bar-to-bar or space-to-space comparisons, or Factor R decoding methods, known to those skilled in the art. Importantly, since the symbology of the present invention employs only single-width bars, the CPU 144 need only identify the spaces in a given symbol, and the widths of these spaces, which significantly reduces the processing overhead required to decode a given symbol, and a less sophisticated electro-optical device 143 or associated optics can be used.

In step 168, the CPU 144 also verifies or determines whether the start character is in focus. The CPU 144 analyzes the signals produced by the bar code reader 142 for the start characters 50 or 52 to determine whether the CPU can recognize the three one-wide elements in the start character (i.e., the two one-wide bars 57 separating the one-wide space 59). If the CPU 144 recognizes the three one-wide elements, then the CPU continues the decoding routine of FIG. 17. Otherwise, if the CPU 144 cannot recognize the three one-wide elements in the start character 50 or 52, the CPU aborts the decode routine, provides unfocused data to the CPU, or performs other functions such as alerting the user that the symbol is not in focus.

If the symbol is in focus so that all of the character values are valid (i.e., map to data characters), then in step 170, the CPU 144 performs the check calculation based on the penultimate symbol character. The CPU 144 applies all of the character values to the modulo 53 check character computation method described above to determine if the result equals the character value of the check character. If so, then in step 172, the CPU 144 converts the character values into data characters based on the table of FIG. 1 by retrieving the appropriate data characters from the memory 146 or the secondary storage 148 depending upon where the appropriate data is stored. The data characters can then be displayed, or used in other applications by the CPU 144, or output over the line 149 to the host computer 151. Alternatively, the CPU 144 can simply output the character values over the line 149 to the host computer 151, which in turn performs the conversion into the corresponding data characters.

While the detailed description above has been expressed, in part, in terms of specific examples, those skilled in the art will appreciate that many other variations could be used to accomplish the purpose of the disclosed invention. Those skilled in the art will recognize that the present invention is usable in variable length data character encoding applications, and is adaptable for use with many other symbologies, and readers and printers of those symbologies. Accordingly, it can be appreciated that various equivalent modifications of the above-described embodiments may be made without departing form the spirit and the scope of the invention. Therefore, of the present invention is limited only by the following claims.

I claim:

1. A method for printing a surface with a bar code symbol, the method comprising the step of:

providing adjacently positioned groups of sequential marks, the groups including four marks of a first width that are all substantially uniformly wide, at selectively spaced intervals within the groups, and including four blank intervals within each of the groups, each of the blank intervals having a plurality of different widths which are integer multiples of a second width, where each group has a total width substantially equal to a sum of four times the first width and nine times the second width.

2. The method of claim 1 wherein the step of providing adjacently positioned groups of sequential marks provides up to 56 different groups of marks and blank intervals between the marks that represent up to 56 different patterns.

3. The method of claim 2 wherein the step of providing adjacently positioned groups of sequential marks provides one group of sequential marks in the symbol that represents a check character, the one group being selected from one of 53 of the 56 groups of marks and blank intervals.

4. The method of claim 3 wherein the step of providing adjacently positioned groups of sequential marks provides groups of sequential marks having blank intervals that have the plurality of different widths, the plurality of different widths not being greater than six times the second width.

5. The method of claim 3 wherein the step of providing adjacently positioned groups of sequential marks provides less than 44 groups of sequential marks that identify a first set of 43 alphanumeric data characters.

6. The method of claim 3 wherein the step of providing adjacently positioned groups of sequential marks provides less than four groups of sequential marks that represent start and stop characters.

7. The method of claim 6 wherein the step of providing adjacently positioned groups of sequential marks provides a selected group of sequential marks that represents a start character that indicates a shift to a numeric compaction mode.

8. The method of claim 6 wherein the step of providing adjacently positioned groups of sequential marks provides a selected group of sequential marks that represents one of the start and stop characters, which includes at least one blank interval that has a width equal to at least twice the second width so that the one character is capable of being optically recognized when out-of-focus.

9. The method of claim 6 wherein the step of providing adjacently positioned groups of sequential marks provides the start and stop characters where one of the start and stop characters includes at least one blank interval having the first width, which is positioned adjacent to two marks whereby a state of focus of the bar code symbol can be determined based on the two marks and the blank interval positioned therebetween.

10. The method of claim 6 wherein the step of providing adjacently positioned groups of sequential marks provides at least five selected groups of sequential marks that identify a switch to a second set of less than 44 data characters.

11. The method of claim 10 wherein the step of providing adjacently positioned groups of sequential marks provides groups of sequential marks of the first and second sets of data characters that represent ASCII characters.

12. The method of claim 3 wherein the step of providing adjacently positioned groups of sequential marks provides at least one selected group of sequential marks identifies numeric compression of data characters following the at least one selected group.

13. A bar code structure comprising a plurality of adjacently positioned bars having spaces between the bars, groups of four bars and four spaces defining individual data characters, each group having four bars of a first width, and each space having one of a plurality of different widths which are integer multiples of a second width, where each group has a total width substantially equal to a sum of four times the first width plus nine times the second width.

14. The bar code structure of claim 13 wherein 56 unique groups exist that represent up to 56 data characters, and wherein 43 of the 56 groups represent a first set of 43 alphanumeric data characters.

15. The bar code structure of claim 14 wherein less than four groups represent start and stop characters.

16. The bar code structure of claim 15 wherein one of 53 of the 56 groups are employed to represent a check character.

17. The bar code structure of claim 15 wherein a selected group represents a start character that indicates a shift to a numeric compaction mode.

18. The bar code structure of claim 15 wherein one of the start and stop characters includes at least one space having a width equal to at least twice the second width so that the one character is capable of being optically recognized when out-of-focus.

19. The bar code structure of claim 15 wherein one of the start and stop characters includes at least one space having the first width, which is positioned adjacent to two marks, whereby a state of focus of the bar code structure can be determined based on the two marks and the space positioned therebetween.

20. The bar code structure of claim 15 wherein each space has the plurality of different widths, the plurality of different widths not being greater than six times the second width.

21. The bar code structure of claim 15 wherein at least five selected groups identified switch to a second set of less than 44 alphanumeric data characters.

22. The bar code structure of claim 15 wherein the first and second sets of data characters represent the ASCII characters.

23. A method of decoding a bar code formed on a surface, the method comprising the steps of:

imaging the bar code symbol to produce a signal representative of the bar code symbol therefrom;

analyzing the signal to identify groups of symbol characters, each symbol character represented by four bars substantially equal to a first width and four spaces substantially equal to integer multiples of a second width, each symbol character having a total width approximately equal to a sum of four times the first width and nine times the second width;

analyzing the signal to determine whether the bar code symbol is in focus; and converting each symbol character into a corresponding character value based on a first predetermined character set if the bar code symbol is in focus.

24. A bar code structure comprising a plurality of adjacently positioned bars having spaces between the bars, groups of four bars and four spaces defining individual data characters, each group having four spaces of a first width, and each bar having one of a plurality of widths which are integer multiples of a second width, where each group has a total width substantially equal to a sum of four times the first width plus nine times the second width.

25. The bar code structure of claim 24 wherein 56 unique groups exist that represent up to 56 data characters, and wherein 43 of the 56 groups represent a first set of 43 alphanumeric data characters.

26. The bar code structure of claim 25 wherein less than four groups represent start and stop characters.

27. The bar code structure of claim 25 wherein each space has the plurality of different widths, the plurality of different widths not being greater than six times the second width.

28. The bar code structure of claim 25 wherein at least five selected groups identified switch to a second set of less than 44 alphanumeric data characters.

29. The bar code structure of claim 24 wherein the first and second widths are approximately equal.

* * * * *